(12) United States Patent
Frazao et al.

(10) Patent No.: US 10,203,419 B2
(45) Date of Patent: Feb. 12, 2019

(54) DETECTOR COMPONENT FOR AN X-RAY OR GAMMA RAY DETECTOR

(71) Applicant: PETSYS ELECTRONICS, MEDICAL PET DETECTORS, SA, Oeiras (PT)

(72) Inventors: Maria Leonor Trigo Franco Frazao, Lisboa (PT); Stefaan Paul K. Tavernier, Hoeilaart (BE); Joao Manuel Coelho Dos Santos Varela, Lisboa (PT)

(73) Assignee: PETSYS ELECTRONICS, MEDICAL PET DETECTORS, SA (PT)

( * ) Notice: Subject to any disclaimer, the term of this patent is extended or adjusted under 35 U.S.C. 154(b) by 0 days.

(21) Appl. No.: 15/521,176

(22) PCT Filed: Oct. 22, 2015

(86) PCT No.: PCT/EP2015/074462
§ 371 (c)(1),
(2) Date: Apr. 21, 2017

(87) PCT Pub. No.: WO2016/062799
PCT Pub. Date: Apr. 28, 2016

(65) Prior Publication Data
US 2017/0336519 A1    Nov. 23, 2017

(30) Foreign Application Priority Data

Oct. 23, 2014   (PT) .......................... 20141000083247

(51) Int. Cl.
*G01T 1/20* (2006.01)
*G01T 1/24* (2006.01)
(Continued)

(52) U.S. Cl.
CPC ............ *G01T 1/1644* (2013.01); *G01T 1/202* (2013.01); *G01T 1/2006* (2013.01); *G01T 1/2018* (2013.01); *G01T 1/24* (2013.01)

(58) Field of Classification Search
CPC ... G01T 1/1644; G01T 1/2006; G01T 1/2018; G01T 1/202; G01T 1/24
See application file for complete search history.

(56) References Cited

U.S. PATENT DOCUMENTS

2010/0148074 A1   6/2010   Menge et al.
2011/0192982 A1   8/2011   Henseler et al.
(Continued)

OTHER PUBLICATIONS

Korzhik et al: "Development of scintillation materials for PET scanners" Nuclear Instruments & Methods in Physics Research. Section A: Accelerators Spectrometers Detectors and Associated Equipment Elsevier BV North-Holland NL vol. 571 No. 1-2 Jan. 26, 2007 (Jan. 26, 2007) pp. 122-25 XP005737902 ISSN: 0168-9002 DOI: 10.1016/J.NIMA.2006.10.044 figure 2 p. 124 left-hand column lines 1-8.

(Continued)

*Primary Examiner* — Mark R Gaworecki
(74) *Attorney, Agent, or Firm* — Lerner, David, Littenberg, Krumholz & Mentlik, LLP (57) ABSTRACT

There is provided a detector component for an X-ray or gamma ray detector, the detector component comprising: a scintillating crystal having a plurality of scintillation crystal pixels and a photodetector. Each scintillating crystal pixel has one or more light exit faces. The photodetector is associated with at least one of the light exit faces of each scintillating crystal pixel, wherein a first and a second scintillating crystal pixel are arranged adjacent to one another, wherein a X-ray or gamma ray interaction with the first scintillating crystal pixel causes the generation of at least one photon, and optical cross talk of the at least one (Continued)

generated photon occurs between the first and the second scintillating crystal pixel, such that the X-ray or gamma ray interaction within the first scintillating crystal pixel is detected in use at the photodetector associated with a light exit face of the second scintillating crystal pixel.

10 Claims, 5 Drawing Sheets

(51) Int. Cl.
    *G01T 1/164*      (2006.01)
    *G01T 1/202*      (2006.01)

(56) References Cited

U.S. PATENT DOCUMENTS

2012/0061577 A1    3/2012   Oleinik et al.
2013/0299707 A1*   11/2013   Levin ..................... G01T 1/164
                                                                                                250/363.03

OTHER PUBLICATIONS

International Search Report for Application No. PCT/EP2015/074462 dated Jan. 18, 2016.

* cited by examiner

DETECTOR COMPONENT FOR AN X-RAY OR GAMMA RAY DETECTOR

CROSS-REFERENCE TO RELATED APPLICATIONS

The present application is a national phase entry under 35 U.S.C. § 371 of International Application No. National Stage of PCT/EP2015/074462, filed Oct. 22, 2015, which claims priority from Portuguese Application No. 20141000083247, filed Oct. 23, 2014, all of which are hereby incorporated herein by reference.

FIELD OF THE INVENTION

The present invention relates to a detector component and a detector for detecting X-rays or gamma rays and, in particular but not exclusively, it relates to a scintillation detector component for detecting X-rays or gamma rays that provides more accurate positioning of the interaction point inside the scintillating crystal pixels.

BACKGROUND TO THE INVENTION

Positron emission tomography (PET) is an imaging technique that is frequently used in nuclear medicine. In PET, a physiologically relevant compound is labelled with a positron-emitting isotope. At some point in time, the radioactive isotope emits a positron, and this positron has a kinetic energy of a few hundreds of keV. The range of the positron in human tissue is usually less than 1 mm. After coming to rest, the positron annihilates into two nearly back-to-back gamma rays of 511 keV. The mean free path of gamma rays of 511 keV in the human body is about 10 cm. In many cases, the two gamma rays will leave the body without undergoing scattering, i.e. with their original direction unchanged.

A PET scanner basically is a detector that surrounds a patient for detecting for example gamma rays of 511 keV. If two 511 keV gamma rays are detected at the same time, these most likely come from the same annihilation event. It can therefore be assumed that the annihilation, and the molecule containing the radioactive isotope, was somewhere on the line joining the two detection points. This line is called a "line of response" (LOR). From observing a large number of positron annihilations in this way, it is possible to derive a three-dimensional distribution of the annihilation events, which is the same as the three-dimensional distribution in the body of the labelled molecules.

Commercial PET scanners typically use scintillating crystals and photodetectors to detect the gamma rays. When a gamma ray interacts in the scintillating crystal, a brief and weak light signal is generated. The light emission can be in the visible range of the optical spectrum, in the ultraviolet or the infrared. Commonly used scintillator materials in PET are BGO ($Bi_4Ge_3O_{12}$), LSO($Lu_2SiO_5$:Ce); LYSO(Lu2-$2xY_{2x}SiO_5$:Ce); GSO ($Gd_2SiO_5$:Ce), and NaI:Tl. The most important properties of a scintillator to be used in a PET scanner are that it must have a short decay time, have a large stopping power for X and gamma rays, and a good energy resolution. The short decay time is important because this allows a good time resolution, and this ensures that the two gamma rays that are detected really come from the same annihilation event rather than from two unrelated annihilation events. The stopping power is important because this ensures a large detection efficiency, and therefore that a large fraction of the annihilation events will be observed. The good energy resolution allows rejection of events where one of the gamma rays undergoes Compton scattering before it is detected.

Although commercially available PET scanners are capable of providing a three-dimensional image of processes in the human body, they do not always provide as accurate an image as desired.

SUMMARY OF THE INVENTION

The present inventors have recognised that there is a need for an improved detector component and detector for more accurate positioning of the interaction point inside the scintillating crystal pixels.

Thus, in accordance with an aspect of the present invention, there is provided a detector component for an X-ray or gamma ray detector, the detector component comprising: a scintillating crystal having a plurality of scintillation crystal pixels, wherein each scintillating crystal pixel is larger in one dimension than in the other two dimensions, and wherein each scintillating crystal pixel has one or more light exit faces; and a photodetector associated with at least one of the light exit faces of each scintillating crystal pixel, wherein a first and a second scintillating crystal pixel are arranged adjacent to one another, wherein a X-ray or gamma ray interaction with the first scintillating crystal pixel causes the generation of at least one photon, and optical cross talk of the at least one generated photon occurs between the first and the second scintillating crystal pixel, such that the X-ray or gamma ray interaction within the first scintillating crystal pixel is detected in use at the photodetector associated with a light exit face of the second scintillating crystal pixel.

The scintillating crystal is divided into two or more scintillating crystal pixels, each scintillating crystal pixel having one or more light exit faces. The light exit face or light exit side, is a face of the scintillating crystal pixel through which the optical photon(s) that are generated (or secondary generated photons) when an X-ray or gamma ray hits the scintillating crystal exits.

In some examples, each scintillating crystal pixel may have one light exit face or each scintillating crystal pixel may have two light exit faces. The scintillating crystal pixel is larger in one dimension than in the other two dimensions. In some preferred examples, the one or more light exit faces may be located at the end(s) of the scintillating crystal pixel having the larger dimension. For example, in the example where the scintillating crystal pixel is a cuboid having dimensions a, b and c, where a>b and a>c, then one or more light exit faces may be located at face b×c.

The photodetector may be associated with light exit face(s) of one or more scintillating crystal pixels of the detector component, and it is preferable that a photodetector that is associated with a particular light exit face is always located at or in close proximity to said light exit face. In other words, unlike current detector components that require at least two photodetectors per scintillating crystal pixel, the detector component of the present invention may comprise the same number of photodetectors as scintillating crystal pixels or a smaller number of photodetectors compared with scintillating crystal pixels. An advantage of such a configuration is that the overall cost of the system is reduced. Furthermore, the presence of excessive photodetectors and their associated electronics between the scintillating crystal pixels and a detection object increases the chance of photon interactions before reaching a scintillating crystal pixel, and so the sensitivity of the detector component is reduced and consequently image quality is lowered. Thus, this is one reason why the arrangement of the present invention allows for better efficiency of the overall detector comprising the detector component and improved image quality.

Optical cross talk of the at least one generated photon occurs in the detector component between a first and a second scintillating crystal pixel that are adjacent one another such that a gamma ray or X-ray interaction (which causes the release of the at least one photon) within the first scintillating crystal pixel which is detected in use at the photodetector associated with a light exit face of the second scintillating crystal pixel. Thus, DOI information can be derived by reading light from only from one end of the scintillating crystal pixels since optical cross talk causes the light arriving at the opposite end of the first scintillating crystal pixel to where the photodetector is located to return to the photodetector side through the adjacent scintillating crystal pixel, and give a signal on the photodetector that is associated with a light exit face of the second scintillating crystal pixel. Accordingly, a more accurate pixel read-out may be achieved by the photodetector as it is possible to identify where along the length of a scintillating crystal pixel the photon interaction occurs.

When the detector component is used in X-ray or gamma detectors for applications such as in PET scanners, CT scanners, gamma cameras, for example, the plurality of scintillating crystal pixels may form a ring-shaped detector, each scintillating crystal pixel being adjacent to at least two other scintillating crystal pixels. This way, the plurality of scintillating crystal pixels may surround, or partially surround, a patient or an animal in use. Alternatively, the plurality of scintillating crystal pixels may be arranged linearly or across a surface, and this configuration of detector that is formed may be particularly advantageous for certain tomography applications such as X-ray security, for example. Alternatively, the plurality of scintillating crystal pixels may form a single detector or two or more detectors or a different shape.

The photodetector may be a solid state photodetector with internal gain. The photodetector may also be a silicon photomultiplier, a multi pixel photon counter, or a digital silicon photomultiplier.

The scintillating crystal pixels may be made slightly absorbing of light in such a way that the amount of light reaching one or each light exit end of the crystal depends on position of the interaction point of the X-ray or gamma ray along the length of the scintillating crystal pixel.

The detector component may further comprise reflective material between at least the first scintillating crystal pixel and the second scintillating crystal pixel, the reflective material covering part or all of a common side between the first and second scintillating crystal pixels. The reflective material may preferably be totally reflecting.

If the reflecting material is arranged to cover part of the common side between the first and second scintillating crystal pixels, then optical cross talk may be enabled by leakage of light in the gap where there is no reflective material. In this case, it is preferable that the uncovered part of the common side is at or substantially towards the opposite end of the scintillating crystal pixels to where the photodetector is located. The gap where there is no reflecting material may be filled with transparent material.

If the reflecting material is arranged to cover all of the common side between the first and second scintillating crystal pixels, then it is preferable that a piece of transparent material is provided at an end of the crystal array distal to the light exit face where the photodetector is located and/or the first and second scintillating crystal pixels may be optically polished in a certain way so as to enable optical cross talk, as will be further explained in detail below.

Alternatively or in addition to the provision of reflective material, the detector component may further comprise a transparent piece of material at an end of the crystal array distal to the light exit face where the photodetector is located, so as to allow optical cross talk between the first and second scintillating crystal pixels.

Alternatively or in addition to the provision of reflective material and the provision of a transparent piece of material, none or only part of a common side between the first and second scintillating crystal pixels may be optically polished, so as to allow optical cross talk between the first and second scintillating crystal pixels.

It may be preferable that optical cross talk between adjacent scintillating crystal pixels occurs at an end of the scintillating crystal pixel distal to the light exit face where the photodetector is located. An advantage of this is that the signal travels further and over a longer period of time than if the optical cross talk occurs at an end of the scintillating crystal pixel near the photodetector.

The ratio of the amplitude of the light signal in the first scintillating crystal pixel to the amplitude of the light signal in the second pixel may depend on the depth of interaction of the X-ray or gamma ray interaction point in the first scintillating crystal pixel. The DOI can be derived from a measurable quantity R, which is defined as:

$$R = \frac{\text{signal of the scintillating crystal pixel with the largest signal}}{\sum \text{signals of all cintillating crystal pixel}}$$

In accordance with a second aspect of the present invention, there is provided an X-ray or gamma ray detector, the detector comprising at least two detector components as described above.

The two detector components may detect complementary X-rays or gamma rays that interact within the scintillating crystal pixels.

BRIEF DESCRIPTION OF THE DRAWINGS

Certain preferred embodiments of the present invention will now be described by way of example only and contrasted to comparative examples with reference to the accompanying drawings, in which.

DETAILED DESCRIPTION OF THE DRAWINGS

Figure 1:
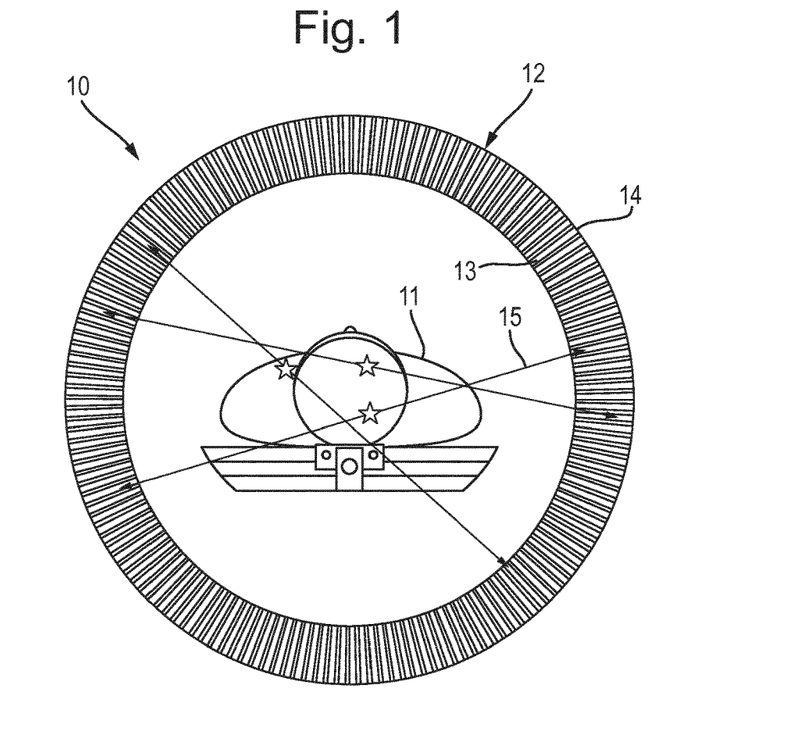
FIG. 1 illustrates the principles of a PET scanner.

In its simplest geometry, a PET scanner consists of one or more rings of scintillator blocks, each equipped with a photodetector, surrounding the patient. A typical PET scanner 10 for a human patient 11 is illustrated in FIG. 1. To enhance the light collection, the sides of the scintillator crystals are usually polished with optical quality polish. On the outside of the scintillator ring 12, each scintillator crystal 13 has its own photodetector 14. The lines represent the directions of flight of the gamma rays originating from a few annihilation events. These gamma rays interact in the scintillator blocks. If two gamma rays interact simultaneously in two scintillator blocks 13, most likely a positron annihilation occurred somewhere along the line joining the centres of the two blocks of scintillating material. If one of the 511 keV gamma rays 15 interacts in one of the scintillator blocks, the position accuracy on this interaction point is equal to the size of the scintillating crystal. It is therefore normal to use a large number of small scintillation crystals, each equipped with its own photodetector. Some PET systems indeed use this scheme.

Figure 2:
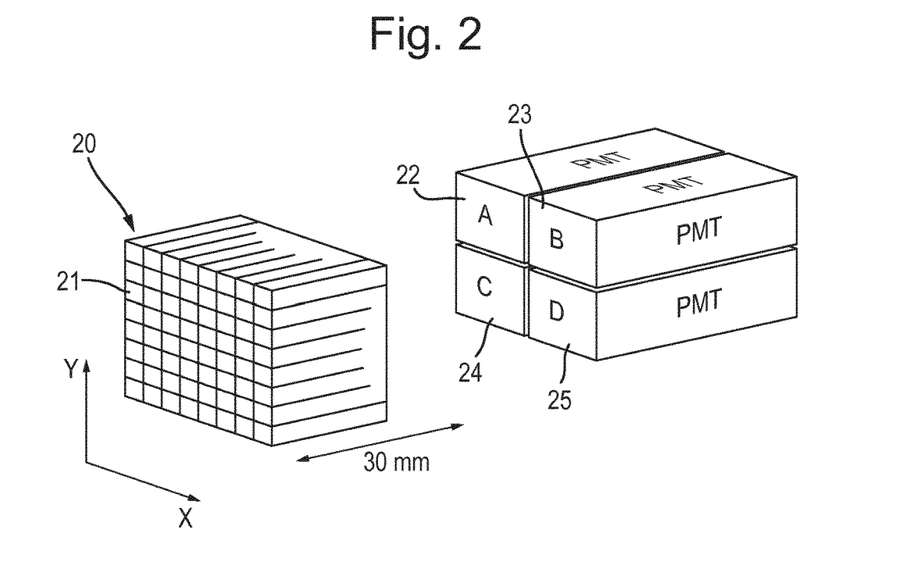
FIG. 2 illustrates the principles of a block detector component that allows the reduction of the number of photodetectors and readout channels in a PET scanner.

However, to reduce the cost, most commercial PET scanners use a system with less photodetectors than crystals. A possible realisation of this method is illustrated in FIG. 2. In this design, groves are cut in a large piece of scintillator crystal 20 such that it is divided in 64 individual crystal pixels 21, and this block of scintillator 20 is in contact with only four photomultiplier tubes 22, 23, 24, 25. The groves are then filled with some material to reduce the optical cross talk between the neighbouring crystal pixels. The groves that are cut in the scintillator do not extend all the way to the bottom of the block of scintillator crystal 20. In this way, the light can spread over the four photomultiplier tubes 22, 23, 24, 25, with the distribution of the light depending on the position of the scintillator crystal 20 where the gamma ray interacted. From the amplitudes of the signals in the photomultiplier tubes, 22, 23, 24, 25, one can calculate the quantities X and Y as follows:

$$X = \frac{(B+D)-(A+C)}{A+B+C+D}$$
$$Y = \frac{(A+B)-(C+D)}{A+B+C+D}$$

The quantities X and Y are approximate positions in the (X,Y) plane of the position of the block of scintillator crystal 20 where the interaction occurred. The mapping between the measured values of (X, Y) and the true positions of the crystal must be determined experimentally.

Figure 3:
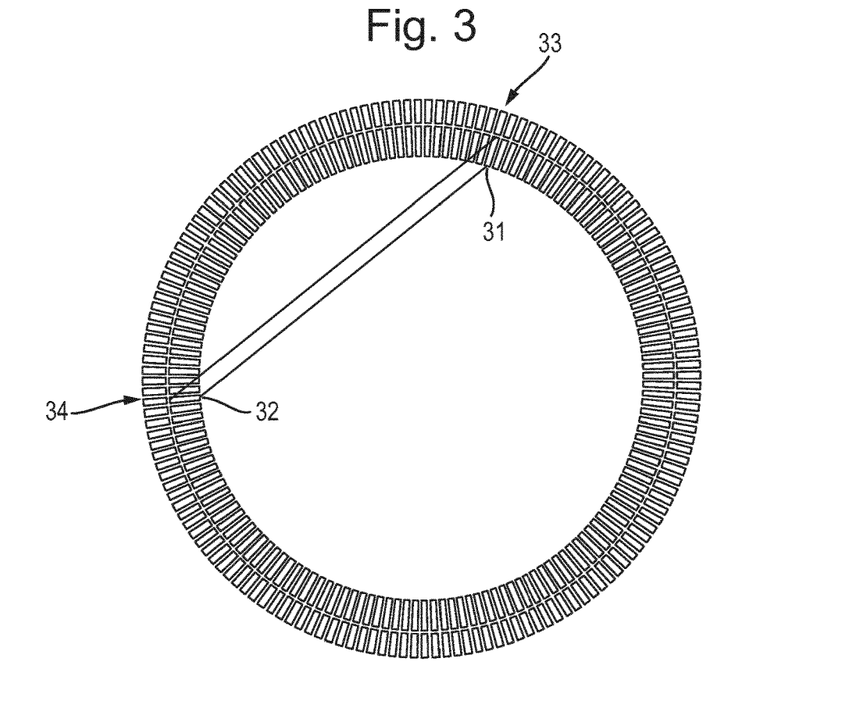
FIG. 3 illustrates the depth of interaction effect in PET scanners.

One of the factors limiting the image resolution in positron emission tomography is the so-called "depth of interaction" (DOI) effect. This effect is illustrated in FIG. 3, and exemplary dimensions are also given. In this figure, it is assumed that the two gamma rays resulting from the annihilation of one photon interact in crystals 31, 32 respectively. These crystals 31, 32 are identified from the signal received from the photodetectors 33, 34 recording the light signals from the crystals 31, 32. Usually it is not known where along the length of the crystal 31, 32 the interaction occurred. If the positron annihilation happens away from the centre of the scanner, this introduces a large uncertainty on the position of the line joining the two gamma interaction points, and therefore on the position of the positron annihilation point. This in turn results in a considerable degradation of the image quality.

One possible method to avoid the resolution degradation due to the DOI effect, is to have a photodetector on both ends of the crystal. If the crystal is totally polished and clad with highly reflective foils on its long sides, the amount of light collected at both ends is independent of the position of the interaction point of the gamma ray along the length of the crystal. However, if the sides of the crystal are not fully polished, the amount of light collected at both ends depends on the interaction point of the gamma or X-ray along the length of the crystal.

Having a photodetector on both ends of the crystal has several drawbacks. The photodetectors and the associated electronics represent a large fraction of the cost of a PET scanner. This method therefore considerably increases the cost of such a system. Moreover, the presence of photodetectors and their associated electronics between the scintillating crystals and the patient increases the chance that the gamma ray interacts somewhere before reaching the scintillating crystal, reducing the sensitivity and affecting image quality.

Thus, a purpose of the present invention is to provide a way to derive the DOI information while reading the crystal light only from one end of the crystal. This can be achieved by causing optical cross talk between neighbouring crystals on a side opposite to the photodetector(s). Such optical cross talk will cause the light arriving at the opposite end of a first scintillating crystal pixel to return to the photodetector side through the neighbouring scintillating crystal pixel, and give a signal on the photodetector that is associated with the neighbouring scintillating crystal pixel. If the crystal is made slightly absorbing, for example by slightly de-polishing one or more sides (the one or more sides preferably being a long side) of the crystal, then the amount of light reaching one or each light exit face or light exit end of the crystal depends on position of the interaction point of the X-ray or gamma ray along the length of the scintillating crystal pixel.

In the example where the scintillating crystal comprises two light exit faces or two light exit sides, the ratio of the pulse amplitudes at both ends may be related to the position of the interaction along the scintillating crystal pixel. Furthermore, the amount of light returning in this way to a neighbouring photodetector will depend on the position of the interaction of the X-ray or gamma ray along the length of the scintillating crystal pixel. The ratio of the amount of light in the scintillating crystal pixel where the interaction occurred, over the amount of light in all other pixels, will then depend on the DOI of the X-ray or gamma interaction.

In principle, any photodetector may be used. For example, photomultiplier tubes may be used. However, photomultiplier tubes are not very practical and the idea is not used in any commercial PET system. The reason that it is difficult to use photomultiplier tubes is that in a photomultiplier tube there is always a thickness of at least 2 mm of glass between the crystal and the photocathode. The spreading of the light in this glass makes it very difficult to correctly derive the DOI and derive the crystal where the interaction occurred. However, photodetectors such as SiPMs are much more practical. Moreover, with SiPMs it is possible to use the light sharing also to identify the crystal where the interaction occurred if there are more scintillating crystals than photodetectors.

Figure 4:
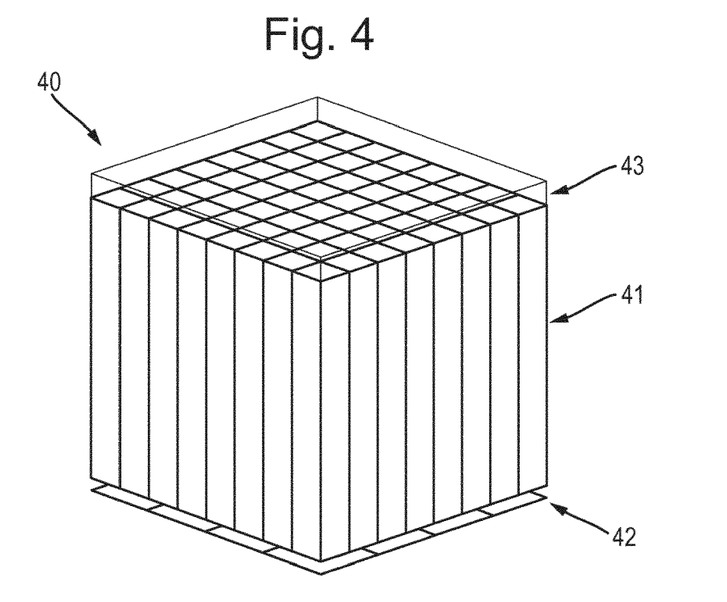
FIG. 4 shows the operation of an example detector component of the present invention.

The most straightforward way to cause the desired optical cross talk is to place a plate of transparent material (for example a plate of glass), on the scintillating crystal array, on a side opposite to the photodetectors. The plate of transparent material should preferably be optically coupled to the scintillating crystals. Such optical coupling can be obtained by applying some transparent glue or transparent grease between the scintillating crystal and the plate of transparent material. An example of this in accordance with an example of the present invention is illustrated in FIG. 4. In FIG. 4, a detector component 40 is shown. Detector component 40 has a 8×8 array of scintillating crystals pixels 41 placed on a 4×4 array of photodetectors 42, which may be a SiPM array. In this exemplary realisation of the present invention, the light cross talk on the opposite side of the photodetectors 42 is obtained by placing a transparent piece of material 43 on the side of the scintillating crystal pixels 41 array opposite to the side of the photodetectors 42. The transparent material can be one piece, or a number of separate pieces; the transparent material can cover the total surface of the opposite side, or only part of it. The transparent material can be optically coupled the scintillating crystals, or the transparent material can pressed against the scintillating crystals without optical contact.

Figure 5:
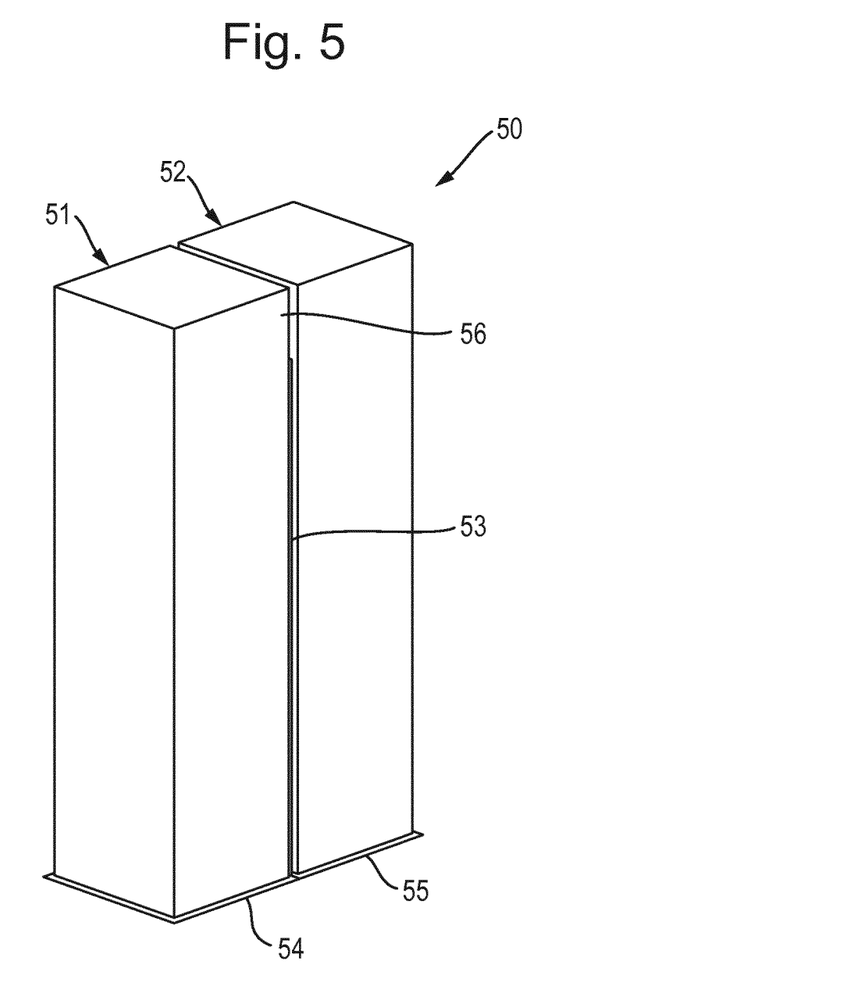
FIG. 5 shows the operation of another example detector component of the present invention.

Another possible realisation of a detector component 50 in accordance with an example of the present invention is shown in FIG. 5. In this exemplary realisation of the present invention, the scintillating crystal pixels 51, 52 are glued together with reflecting material 53, which may be totally reflecting material, in the gaps between adjacent crystal pixels 51, 52, preventing the leaking of light to the adjacent crystal pixels 51, 52. Only in a small part of the separation gap, on the side of the scintillating crystal pixels 51, 52 opposite to the photodetectors 54, 55, there is no reflecting material in the gap 56, allowing some of the light to leak to the neighbouring scintillating crystal pixels 51, 52. The gap 56 where the light leaks to the neighbouring scintillating crystal pixels 51, 52 should preferably filled with transparent material.

In each of FIGS. 4 and 5, the scintillating crystal pixels 41, 51, 52 are longer in one dimension than the other two dimensions. Further, it is advantageous to arrange the scintillating crystal pixels so that the generated photons travel across the longest dimension because a minimum length of crystal pixel is required for absorption; typically, to absorb a photon of 511 keV, a cerium doped lutetium yttrium orthosilicate (LYSO) or cerium doped lutetium oxyorthosilicate (LSO) crystal pixel of 1.5 cm or 2 cm in its longest dimension is needed in order to achieve sufficient spatial resolution.

Figure 6:
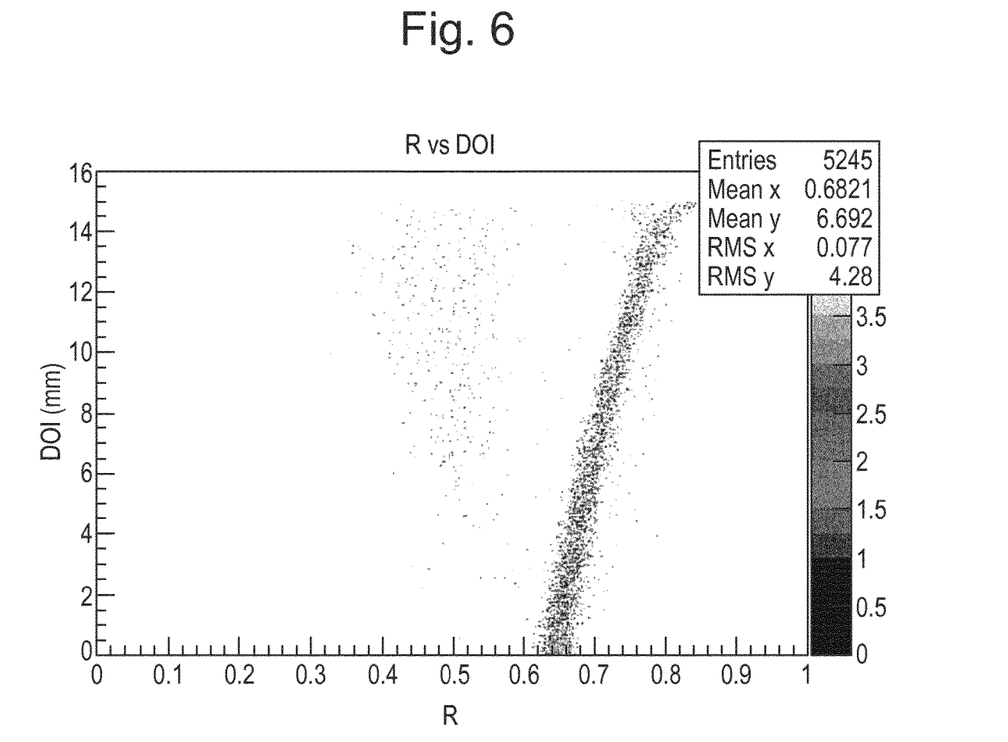
FIG. 6 shows the depth of interaction resolution for varying signals in accordance with an example detector component of the present invention.
Figure 7:
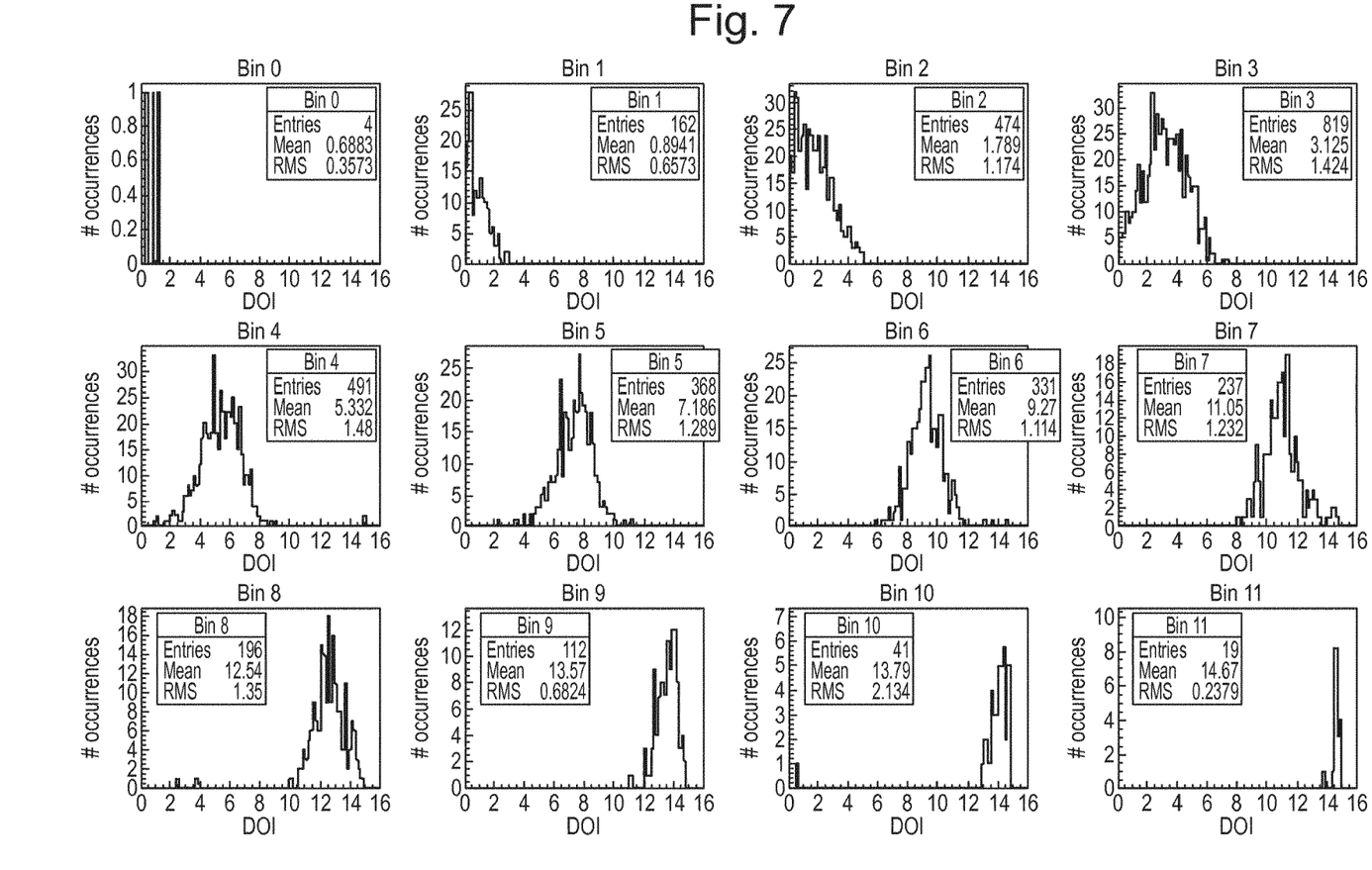
FIG. 7 shows the depth of interaction resolution that can be obtained by an example detector component of the present invention.

To prove the validity of the idea, the geometry illustrated in FIG. 4 is simulated, the results of which are shown in FIGS. 6 and 7. In this simulation the dimension of the scintillating crystal pixels were 1.53×1.53×15 mm, and the transparent material was a glass plate of 1 mm thick. The simulation was done with the simulation software GEANT4. In the simulation it was assumed that the separations between the crystal pixels were filled with Vikuity ESR reflective foils. Such foils are highly reflecting, but nevertheless allow some of the light to leak to the neighbouring scintillating crystal pixels.

In FIGS. 6 and 7, the DOI can be derived from a measurable quantity R, which is defined as:

$$R = \frac{\text{signal of the } SiPM \text{ pixel with the largest signal}}{\sum \text{signals of all } SiPMs}$$

FIG. 6 shows the plot of the distribution of the parameter R versus the true DOI of the interaction for one of the scintillating crystal pixels which is not at the edge of the SiPM array. In this figure we see a clear correlation between the DOI and the value of R. We also see a number of scattered points outside the correlation band. These points are due to gamma interactions where the gamma ray first underwent a Compton scattering in one of the crystals, and subsequently interacted in another crystal of the array. Such events should be rejected because the position information obtained from these events is inaccurate.

FIG. 7 shows the DOI resolution that can be obtained by an example detector component of FIG. 4 within a detector. This plot shows the histogram of the DOI value for different bins of the experimentally measurable value of the parameter R. The 16 histograms correspond to 16 bins of the variable R going from 0.6 to 0.8. The horizontal axis gives the DOI value in mm. We can see that the DOI resolution is about 3 mm FWHM.

It will be appreciated that although some of the examples of the present invention described above refer to preferred examples and embodiments, the principles of these examples may be applied to all aspects, examples and embodiments of the present invention, including those defined in any of the claims. Furthermore, features that are described in the context of separate examples or embodiments may be provided in combination in a single example or embodiment, and conversely, features that are described in the context of a single example or embodiment may also be provided separately or in any suitable sub-combination.

The following are particularly preferred aspects according to the present disclosure.

Numbered clause 1. A detector for X-ray or gamma rays, the detector having a plurality of scintillating crystals with at least two scintillation crystals, and where the scintillating crystals are larger in one dimensions than in the two other dimensions, and with one or two light exit sides; and with reflective material placed between at least some of the scintillating crystal pixels, the reflective material covering part or all of the common side between two adjacent crystals; and with a photodetector on one of the light exit sides.

Numbered clause 2. A detector for X-ray or gamma rays as in clause 1 where the photodetector is a solid state photodetector with internal gain.

Numbered clause 3. A detector for X-ray or gamma rays as in clause 1 or 2 when the photodetector is a Silicon photomultiplier, a multi pixel photon counter, or a digital silicon photomultiplier.

Numbered clause 4. A detector for X-ray or gamma rays as in clause 1, 2, or 3 where the scintillating crystal is made slightly absorbing for the scintillation light in such a way that the amount of light reaching each end of the crystal depends on position of the interaction point of the gamma ray long the length of the crystal.

Numbered clause 5. A detector for X-ray or gamma rays as in clause 1, 2, 3 or 4 where the absorption of the scintillation light reaching each end of the crystal is obtained by having part or all of at least one side of the scintillating crystal not optically polished.

Numbered clause 6. A detector for X-rays or gamma rays as in clause 1, 2, 3, 4 or 5, where the light is caused to leak from one pixel to the adjacent pixels, and where the light leak is mainly present on the side of the crystal array opposite to the light exit side where there is a photodetector.

Numbered clause 7. A detector for X-ray or gamma rays as in clause 1, 2, 3, 4, 5, or 6 where the light leak to the adjacent pixels is caused by placing a piece of transparent material on the side of the crystal array opposite to the light exit side.

The transparent material can be one piece, or a number of separate pieces; the transparent material can cover the total surface of the opposite side, or only part of it. The transparent material can be optically coupled the scintillating crystals, or the transparent material can pressed against the scintillating crystals without optical contact.

Numbered clause 8. A detector for X-ray or gamma rays as in clause 1, 2, 3, 4, 5, or 6 where the light leak to the adjacent pixels is caused by having the separation gap or gaps between the crystals at the opposite side of the photodetector, not filled with reflective material, allowing some of the light to leak to the adjacent scintillating crystal pixel.

Numbered clause 9. A detector for X-ray or gamma rays as in clause 1, 2, 3, 4, 5, 6, 7, or 8, where the ratio of the amplitude of the light signal in the scintillating crystal pixel where the gamma ray interacted, to the amplitude of the light signal in one or more of the other pixels, depends on the DOI of the gamma ray or X-ray interaction point in the crystal where it interacted.

The invention claimed is:

1. A detector component for an X-ray or gamma ray detector, the detector component comprising:
   a scintillating crystal having a plurality of scintillating crystal pixels forming a crystal array, wherein each scintillating crystal pixel is larger in one dimension than in the other two dimensions, and wherein each scintillating crystal pixel has one or more light exit faces; and
   a photodetector associated with at least one of the light exit faces of each scintillating crystal pixel,
   wherein a first and a second scintillating crystal pixel are arranged adjacent to one another, wherein a X-ray or gamma ray interaction with the first scintillating crystal pixel causes the generation of at least one photon, and optical cross talk of the at least one generated photon occurs between the first and the second scintillating crystal pixel, such that the X-ray or gamma ray interaction within the first scintillating crystal pixel is detected in use at the photodetector associated with a light exit face of the second scintillating crystal pixel; and
   wherein the detector component comprises a plate of transparent material at an end of the crystal array distal to the light exit face where the photodetectors are located, the plate of transparent material being planar over a whole area of the crystal array.

2. A detector component for an X-ray or gamma ray detector according to claim 1, wherein the photodetector is a solid state photodetector with internal gain.

3. A detector component for an X-ray or gamma ray detector according to claim 1, wherein the photodetector is a silicon photomultiplier, a multi pixel photon counter, or a digital silicon photomultiplier.

4. A detector component for an X-ray or gamma ray detector according to claim 1, wherein the scintillating crystal pixels are made slightly absorbing of light in such a way that the amount of light reaching one or each light exit face of a given scintillating crystal pixel depends on position of the interaction point of the X-ray or gamma ray along the length of the given scintillating crystal pixel.

5. A detector component for an X-ray or gamma ray detector according to claim 1, wherein the detector component further comprises reflective material between at least the first scintillating crystal pixel and the second scintillating crystal pixel, the reflective material covering part or all of a common side between the first and second scintillating crystal pixels.

6. A detector component for an X-ray or gamma ray detector according to claim 1, wherein none or only part of a common side between the first and second scintillating crystal pixels is optically polished.

7. A detector component for an X-ray or gamma ray detector according to claim 1, wherein optical cross talk between adjacent scintillating crystal pixels occurs at an end of the crystal array distal to the light exit face where the photodetector is located.

8. A detector component for an X-ray or gamma ray detector according to claim 1, wherein the ratio of the amplitude of the light signal in the first scintillating crystal pixel to the amplitude of the light signal in the second pixel depends on the depth of interaction of the X-ray or gamma ray interaction point in the first scintillating crystal pixel.

9. An X-ray or gamma ray detector, the detector comprising at least two detector components according to claim 1.

10. A detector component for an X-ray or gammy ray detector according to claim 1, wherein the plate of transparent material is a glass plate having a constant thickness.

* * * * *